INVENTORS
JAMES I. MERANDA
ALAN H. PHILLIPS
BY
Robert J. Haase
ATTORNEY

INVENTORS
JAMES I. MERANDA
ALAN H. PHILLIPS
BY Robert J. Haase
ATTORNEY

United States Patent Office 3,325,809
Patented June 13, 1967

3,325,809
SYNCHRONOUS INTERFERENCE REJECTION SYSTEM FOR RECEIVERS OF PHASE CODED CARRIER SIGNALS

James I. Meranda, Flushing, and Alan H. Phillips, Syosset, N.Y., assignors to Sperry Rand Corporation, Great Neck, N.Y., a corporation of Delaware Filed July 19, 1965, Ser. No. 472,886
7 Claims. (Cl. 343—103)

ABSTRACT OF THE DISCLOSURE

First pulse sampling means segregate into a first receiver channel the received pulses of a desired signal which are primarily sensitive to the presence of one interfering signal and into a second receiver channel other received pulses of the desired signal which are primarily sensitive to a different interfering signal. Additional pulse sampling means detect the presence of each type of interference and selectively inhibit the first pulse sampling means to block the channel through which flow the pulses which are primarily sensitive to the detected interference.

Figure 1:
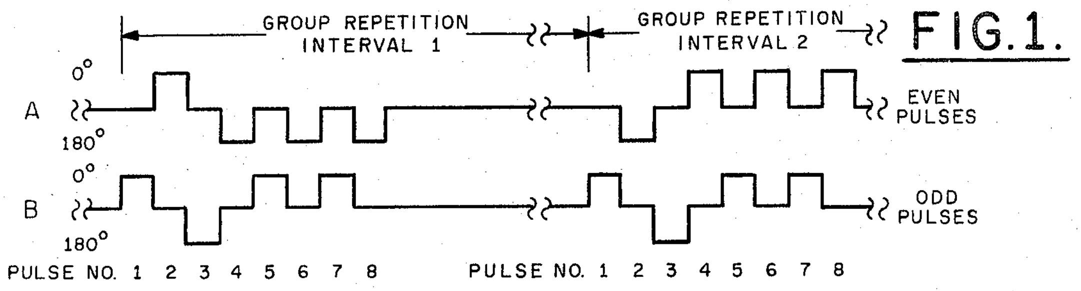

The present invention generally relates to synchronous interference rejection systems and, more particularly, to such a system which exploits the properties of phase coded carrier signals for discriminating against synchronous interference and in favor of desired phase coded carrier signals.

U.S. Patent 3,099,795, issued on July 30, 1963 to Robert L. Frank and assigned to the present assignee describes radio transmitter and radio receiver apparatus which operate, respectively, to transmit predetermined phase modulated and pulsed signals (phase coded signals) and to receive said signals to the substantial exclusion of all other signals not phase modulated in such predetermined manner. Phase coding is defined as involving the shifting of the phase of the transmitted carrier in steps of predetermined amounts of phase shift between successive transmissions, which transmissions may also be pulse modulated. Thus, the transmitted carrier is both amplitude modulated in the form of pulses and phase modulated by the aforementioned shifts in the phase of the carrier. As discussed in said patent, very special and important signal detection properties are achievable through the use of certain carrier phase progressions between the successively transmitted pulses. One of the advantages accruing to the use of special carrier phase codes as described in the aforementioned patent is that a continuous wave interfering signal can adversely affect only a fraction of the total phase coded signals. For example, where the total phase coded signals comprises eight groups of phase coded signals, a single continuous wave interfering signal can be made phase coherent with only one of the eight groups of the phase coded signals. Consequently, the response of the phase coded signal receiver to the single interfering signal is only one-eighth as much as that which would be produced if phase coding were not used.

The total phase coded signals may be thought of as comprising a plurality of different frequency components, each frequency component corresponding to a respective group of pulses of the total phase coded signals. Only those pulses which comprise the group corresponding to the frequency component identical to the frequency of the interfering signal are adversely affected. All of the other groups of pulses of the total phase coded signals, corresponding to frequencies other than the frequency of the interfering signal are wholly unaffected by the interfering signal. Inasmuch as the total phase coded signals is cyclically repeated, the pulses comprising the same group continue to be adversely affected by a given continuous wave interfering signal so long as the interfering signal persists.

Phase coded carrier signals are used to advantage in present day loran C transmitting and receiving equipment. Unfortunately, a loran C receiver must operate in the presence of other communication and/or navigation systems allocated to the frequency band which includes the loran C operating frequency of 100,000 cycles per second. The other systems include those using continuous wave carriers, on-off keyed carrier signals, and frequency-shift keyed carrier signals. Although the phase coding of the loran C equipment greatly reduces the undesirable consequences of in-band continuous wave interfering signals from the non-loran apparatus it does not by itself afford complete protection.

One object of the present invention is to provide a receiver of phase coded signals in which interference affecting less than all of the frequency components of the received phase coded signals is suppressed.

Another object is to provide a receiver of phase coded signals which is responsive to all of the frequency components of the received phase coded signals in the absence of interference and which is responsive to fewer of the frequency components in the presence of interference affecting less than all of the frequency components.

Another object is to provide a receiver of phase coded signals which is responsive to all the frequency components of the received phase coded signals when no frequency component is affected by interference as well as when every frequency component is affected by interference.

These and other objects of the present invention, as will appear from a reading of the following specification, are accomplished in a preferred embodiment by the provision of a receiver of phase coded signals so arranged that the pulses of the received signal corresponding to respective frequency components are separated into a number of groups equal to or less than the number of said frequency components. For example, if the phase coding employed establishes two frequency components each consisting of a given number of pulses, the received pulses corresponding to the first frequency component are detected in a first receiver channel while the received pulses corresponding to the second frequency component are detected in a second receiver channel. Detection is accomplished with the use of locally generated sampling pulses which are aligned to respective ones of the received phase coded pulses. Those sampling pulses corresponding to the received pulses of the first component frequency are applied to the first receiver channel. Those sampling pulses corresponding to the received pulses of the second component frequency are applied to the second receiver channel.

In addition to the sampling pulses which are applied to the first and second receiver channels, an equal number of advance sampling pulses are generated for detecting the presence of any signal occurring immediately prior to each of the received phase coded signals. Each advance sampling pulse detects the presence of signals in the time interval prior to the occurrence of a respective pulse of the received phase coded signal. A continuous wave interfering signal would occur during each such time interval. Signals detected by the advance sampling pulses corresponding to the sampling pulses of the first frequency component are applied to a third receiver channel. Signals detected by the advance sampling pulses corresponding to the sampling pulses of the second frequency component are applied to a fourth receiver channel.

The detected signals of the third and fourth receiver channels are applied to respective lowpass filters and respective signal threshold circuits. An output signal is produced by a threshold circuit when its respective filter output is in excess of its threshold. The outputs of the threshold circuits are logically combined so that if either but not both of said thresholds have been exceeded a signal is produced for inhibiting the detection of the received phase coded pulses corresponding to the frequency component channel whose threshold has been exceeded. If both thresholds are exceeded or if neither threshold is exceeded, then no inhibition is produced against the detection of any of the received phase coded pulses. In summary, those phase coded pulses corresponding to the frequency components experiencing interference are discarded by the receiver so long as other phase coded pulses exist which correspond to frequency components not effected by the interference. Otherwise, all of the received phase coded pulses are retained for detection irrespective of whether none of the components or all of the frequency components experience interference.

In the more general aspects of the present invention, more than two frequency components may be created by the phase coded signals. The pulses of the received signals may be combined in groups equalling the number of frequency components, or alternatively, they may be combined in groups fewer than the number of frequency components. For example, if eight frequency components are generated, the pulses corresponding to four different frequency components may be combined in one group while the remaining pulses corresponding to the remaining four frequency components may be combined in a second group in the interest of reducing receiver hardware. Then, if any one or more component frequencies in the same group are subjected to interference, the entire group of pulses is discarded in the receiver so long as none of the component frequencies of the other group experience interference. Irrespective of the particular receiver design employed (based upon cost versus performance tradeoffs), the invention provides for the grouping of pulses corresponding to respective frequency components, sensing for the presence of interference with respect to each individual frequency component and then discarding all pulses corresponding at least to the frequency component experiencing the interference unless all frequency components are affected. Thus, the receiver responds only to those pulses experiencing no interference unless all frequency components simultaneously experience interference in which case there would be no advantage in discarding any or all of the received phase coded signals.

Figure 2A:
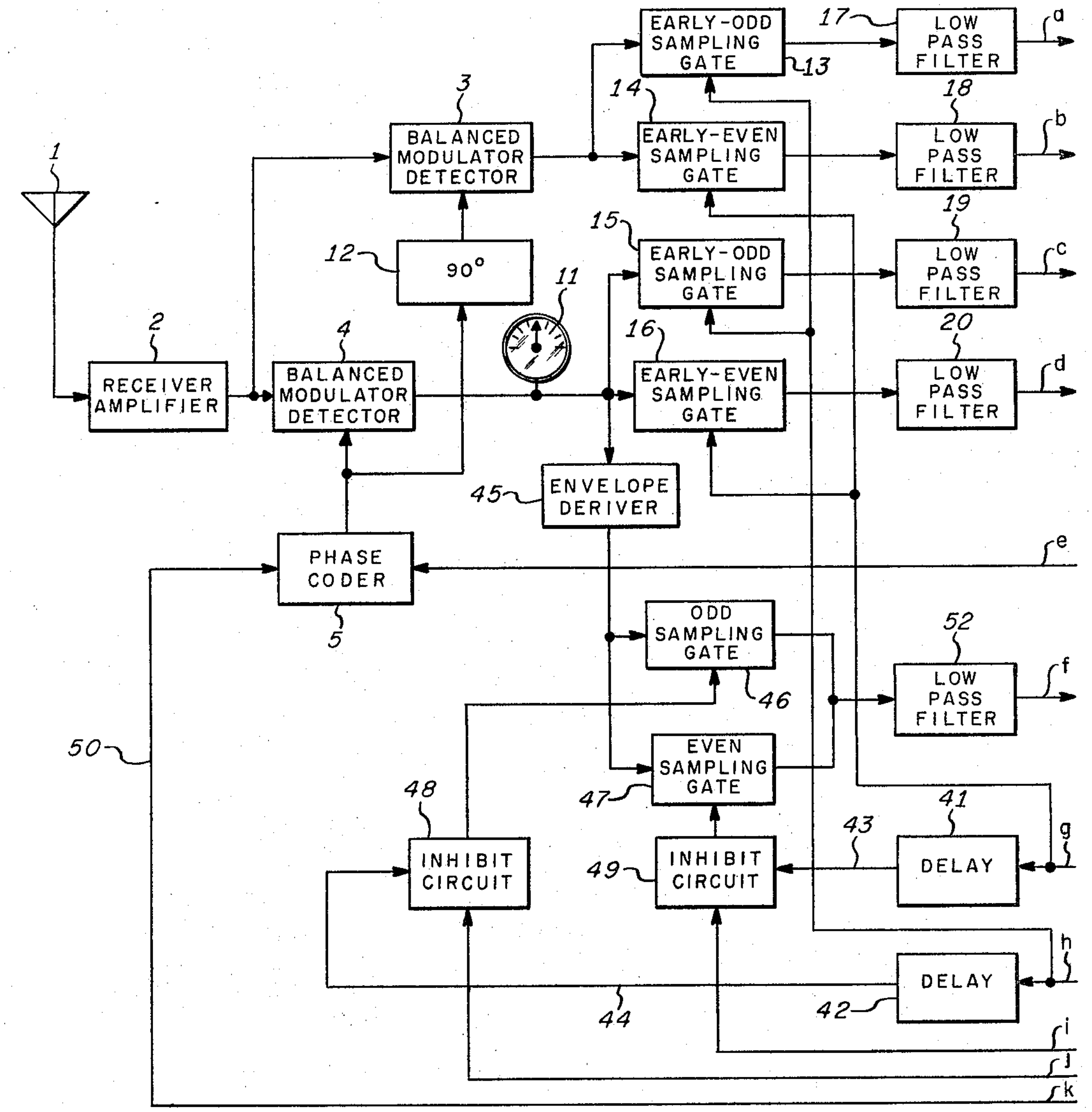
Figure 2B:
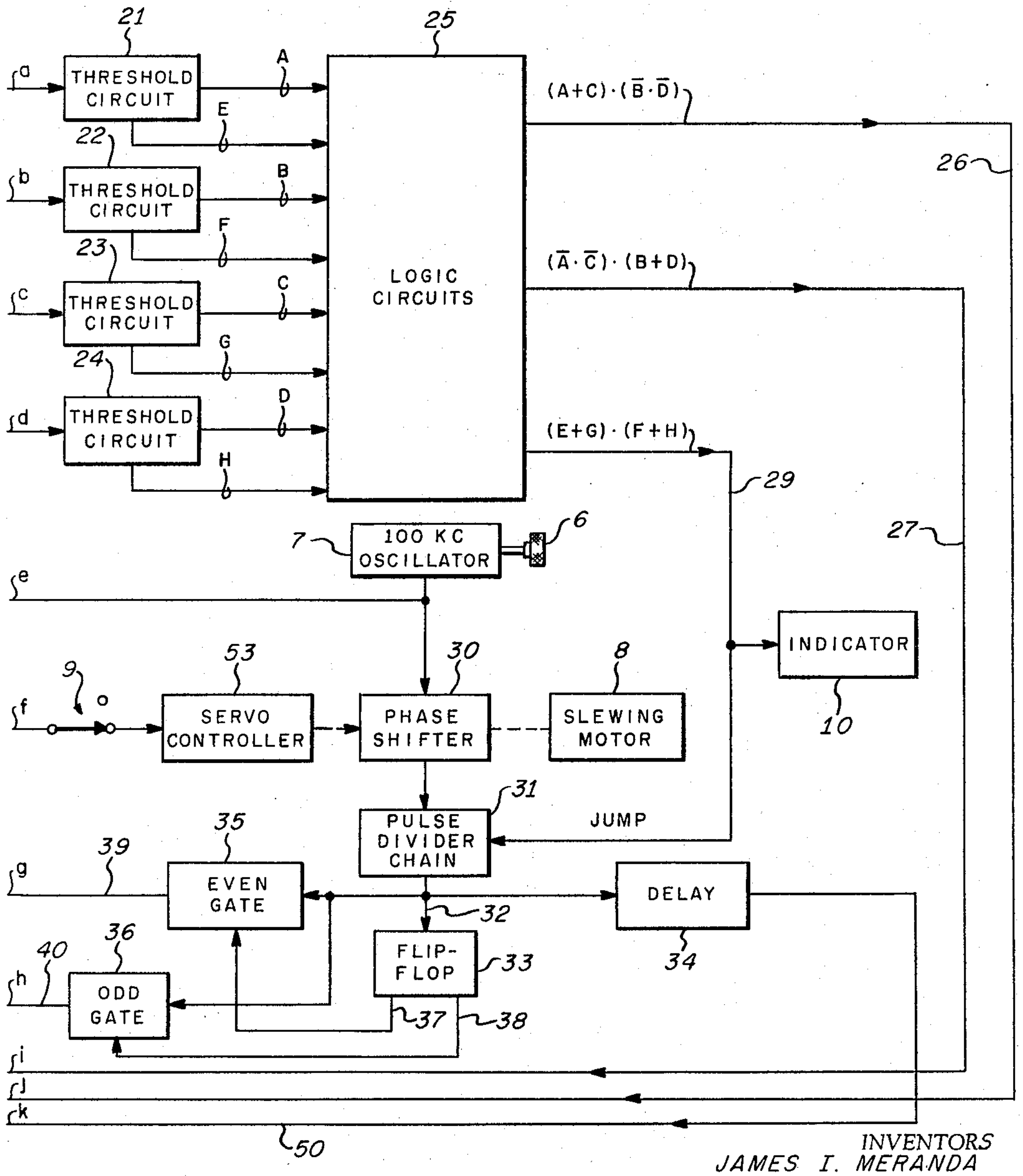

For a more complete understanding of the present invention, reference should be had to the following specification and to the appended figures of which:

FIGURE 1 is a series of phase progression patterns illustrative of two different frequency components comprising the phase coded signals received in the embodiment of FIGURE 2; and FIGURES 2*a* and 2*b* are a simplified block diagram of a preferred receiver embodiment of the present invention.

In order to understand the operation of the preferred receiver embodiment of FIGURE 2, it will first be necessary to consider a typical phase coded signal which may be received by antenna 1. Included within the board generic category of phase coded signals described in U.S. Patent No. 3,099,795, there is the relatively simple binary phase coded signals described in FIG. 2(*b*) of the paper "Multiple Pulse and Phase Code Modulation in the Loran-C System" by Robert L. Frank, in the June 1960 IRE Transactions on Aeronautical and Navigational Electronics on page 55. The simple phase code is binary in the sense that the successive transmitted pulses are either exactly in phase with an assumed continuous wave reference signal or else exactly 180° out of phase therewith. More particularly, the master transmitting station contemplated by the aforementioned IRE paper emits a total of sixteen phase coded pulses which follow a very special phase progression pattern from one pulse to the next. The entire phase progression pattern repeats upon the completion of integral multiples of sixteen pulses. The cyclically repetitive phase progression pattern comprises two groups of eight pulses each, the first group having the successive phases relative to an assumed continuous wave reference signal of 0°, 0°, 180°, 180°, 0°, 180°, 0° and 180°. The second group of eight pulses has the successive phases relative to the same continuous wave reference signal of 0°, 180°, 180°, 0°, 0°, 0°, 0°, and 0°. As also described in the IRE paper, the loran-C transmitters are multiple-pulsed, i.e., the master station emits a group of eight pulses following which each of the slave stations transmits a group of eight pulses in turn. Then, the master station transmits a second group of eight pulses whose phase code is different from the phase code of the first group of eight pulses. Thus, the master station and each of the slave stations transmit a group of eight pulses at a regularly recurring group repetition rate whereby half of the total phase progression pattern is transmitted with each group from each station and the total phase progression pattern is repeated every second transmitted group.

The phase progression patterns of FIGURE 1 represent the pulses transmitted by the master loran transmitter during any two successive group repetition intervals. The even-numbered pulses of pattern A have been separated from the odd-numbered pulses of pattern B just as they are separated by the operation of the receiver of FIGURE 2. Pattern A of FIGURE 1 represents the phases of the even-numbered pulses of two successive group repetition intervals whereas pattern B represents the phases of the odd-numbered pulses during the same two repetition intervals. According to pattern A, the second, fourth, sixth and eighth pulses emitted by the master transmitter during the first group repetition interval have the phases 0°, 180°, 180° and 180° relative to a continuous wave reference signal. During the next group repetition interval, the same even-numbered pulses have the relative phases of 180°, 0°, 0° and 0°. During the first repetition interval, the odd-numbered pulses represented by pattern B have the relative phases of 0°, 180°, 0° and 0°. During the next repetition interval, the odd-numbered pulses have the relative phases of 0°, 180°, 0° and 0°.

It should be noted that phase progression pattern A has a repetition rate equal to one-half the pulse group repetition rate. That is, pattern A repeats itself over a time interval equal to twice a single group repetition interval. It should also be noted that pattern A is of such form that all even multiples of the group repetition rate are zero by Fourier analysis. If the receiver were to respond only to the even-numbered pulses transmitted by the master station, it would respond to any signal whose carrier was displaced in either direction from the loran transmitter carrier by the amount $N/2$ times the group repetition rate where N represents any odd whole integer. The receiver would not be responsive to any signal whose carrier was displaced from the loran transmitter carrier in either direction by the amount M times the group repetition rate where M represents any integer. Therefore, the receiver can be made non-responsive to signals displaced from the carrier frequency in either direction by M times the group repetition frequency by sampling the even-numbered pulses only, and not the odd-numbered pulses.

In a similar manner, it can be seen by inspection that pattern B recurs every group repetition interval so that a receiver responding only to the odd-numbered pulses would only respond to any signal displaced in either direction from the carrier frequency of the loran pulses by M times the group repetition rate where M represents any whole integer. The receiver would not be responsive to any signal whose carrier was displaced from the transmitter carrier in either direction by the amount $N/2$ times the group repetition rate, where N represents any odd whole integer. Therefore, the receiver can be made non-responsive to signals displaced from the loran carrier frequency in either direction by $N/2$ times the group repetition frequency (N odd) simply by sampling the odd pulses only and not the even-numbered pulses.

The objective that the receiver reject continuous wave interfering signals can be met by providing means which segregate the odd-numbered received pulses from the even-numbered received pulses and determine whether interfering signals are being received with either or both the odd and even pulses. Interfering signals having a frequency equal to 100 kc.± odd multiples of one-half the group repetition interval will be received with the even-numbered pulses. Response to such interfering frequencies can be eliminated simply by not sampling the even-numbered pulses. Likewise, if the frequency of the continuous interference is equal to 100 kc.± even-multiples of the group repetition rate, it will be received with the odd-numbered pulses. Receiver responsive to such interference can be eliminated by simply not sampling the odd-numbered pulses. These functions are performed by the receiver represented in FIGURE 2.

Phase coded pulsed signals from, say, a master loran transmitting station, are received by antenna 1 and amplified in receiver-amplifier 2. The amplified signals are applied jointly to balanced modulator-detectors 3 and 4. Detectors 3 and 4 additionally receive a locally generated phase coded signal from phase coder 5 having the same phase progression, i.e., identically the same phase code, as that of the received signals. Although the phase progression pattern or phase code of the received signals is known in advance, generally the receiver generated phase coded signals will not be in proper time phase with respect to the received signals at the time the receiver first is energized. Proper timing is achieved between the locally generated signals and the received phase coded signals by manipulation of phase control knob 6 on 100 kc. oscillator 7, slewing motor 8 and switch 9 with the aid of indicator 10 and meter 11, in a manner to be described later.

When proper timing is achieved between the locally generated and the received signals, the two signals will be in phase with respect to each other at the inputs of detector 4 and in a quadrature phase relationship at the inputs of detector 3, as a result of 90° phase shift network 12 through which the locally generated phase coded signals are applied to detector 3. The output signals of detector 3 are applied to "early-odd" and "early-even" sampling gates 13 and 14, respectively. The term "early-odd" refers to the advance sampling pulses which sample the received signals just prior to the occurrence of the odd-numbered pulses. Similarly, the term "early-even" refers to the advance sampling pulses which sample the received signals just prior to the occurrence of the even-numbered pulses. The output signals of detector 4 are applied both to "early-odd" sampling gate 15 and to "early-even" sampling gate 16. Thus, one "early-odd" sampling gate and one "early-even" sampling gate are provided for each of the detectors 3 and 4. The described arrangement of the quadrature-driven detectors 3 and 4 is provided so that the receiver will respond to the incoming phase coded signals irrespective of any fortuitous phase relationship that might obtain initially between the locally generated and the received signals. It will be noted that were only one detector employed, there would be no response to the received pulses in the even of an accidental quadrature phase relationship between the incoming and the local signals at the inputs to the single detector prior to the time that a proper in phase relationship is established by manipulation of controls 6, 8 and 9 previously mentioned.

The outputs of sampling gates 13, 14, 15 and 16 are connected to lowpass filters 17, 18, 19 and 20, respectively. The outputs of said filters, in turn, are connected to threshold circuits 21, 22, 23 and 24, respectively. Each of said threshold circuits is designed in a conventional manner to produce a first output signal in the event that the input signal from its respective lowpass filter exceeds a first predetermined value (threshold) and to produce a second output signal in the event that the input signal exceeds a second (higher) predetermined value. The outputs of the threshold circuits are applied to logic circuit 25.

Logic circuit 25 is an instrumentation of the principles of operation of the receiver of the present invention. Recapitulating, said principles are as follows. In the event that a frequency component of the received phase coded signals is affected by interference, those pulses of the received signal corresponding to and responsive to said interference are discarded in the receiver provided that there is at least one other component frequency not affected by interference. A manifestation of the fact that one of the component frequencies is being subjected to interference is the appearance of an output signal on line A or C at the output of circuits 21 and 23, respectively, or by the appearance of a signal on line B or D at the outputs of circuits 22 and 24, respectively, depending upon whether the interference affects the odd-numbered pulses only, or the even-numbered pulses only.

If the odd-numbered pulses experience interference, several output signal possibilities exist. In the event that the phase relationship between the locally generated and received signals is such that no output is produced from detector 3 but an output is produced from detector 4 in the presence of odd-pulse interference then an output will be produced only on line C but not on line A. Conversely, if the phase relationship between the local and received signals is changed by 90°, an output signal will appear on line A only but not on line C. If the phase relationship between the local and received signals is other than 0°, 90°, 180° or 270° (measured between the output of amplifier 2 and the outer of phase coder 5), then output signals will be produced by both detectors 3 and 4 and signals will appear simultaneously on lines A and C. Assuming further that there is no even pulse interference, no output signals will be produced on line B or D. Therefore, the condition that the first frequency component (odd pulses) but not the second frequency component (even pulses) is being subjected to interference is manifested by the presence of A and the absence of both B and D or the presence of C and the absence of both B and D or, alternatively, the presence of A and C and the absence of B and D. Any of these manifestations produce a signal on line 26. Similarly, the condition that the second frequency component but not the first frequency component is being subjected to interference is manifested by the presence of B and the absence of both A and C or the presence of D and the absence of both A and C or, alternatively, the presence of B and D and the absence of A and C. Any of the last three conditions produce a signal on line 27. Numerous logic circuit designs will occur to those skilled in the art for producing the designated signals on lines 26 and 27 in response to the described input signals to circuits 25.

Signals E, F, G and H are produced when the amplitude of the signals at the outputs of filters 17, 18, 19 and 20 are in excess of the threshold of signals A, B, C and D, respectively. The higher thresholds E, F, G and H can be exceeded in the event that the sampling pulses applied to gates 13, 14, 15 and 16 temporarily are misaligned, during the process of proper alignment, so that they sample the received loran pulses rather than in advance of the received loran pulses. Loran signal components generally produce outputs from the lowpass filters 17, 18, 19 and 20 of much greater amplitude than the interference components because the frequency of the loran signals is equal to the frequency of the reference signals applied to detectors 3 and 4 whereas the same is not true of the interference frequency. Additionally, loran signal components inevitable will pass both the even and the odd sampling gates. Consequently, the condition of misalignment of the receiver is evidenced by the appearance of a signal on line 29 representing that E or G is present and that F or H are present. The signal on line 29 is applied to indicator 10. The mispositioning of the early sampling pulses applied to gates 13, 14, 15 and 16 which results in the actuation of indicator 10 is desirable temporarily during the course of achieving proper alignment of the early sampling pulses as will be described later.

The sampling pulses and the locally generated phase coded pulses are generated from signals derived from 100 KC oscillator 7. The signals from oscillator 7 are applied to phase shifter 30 and to phase coder 5. The output signals from phase shifter 30 are applied to pulse divider chain 31 which produces grouped sampling pulses on line 32 in a conventional manner similar to the teachings of U.S. Patent 2,835,888, issued to Robert L. Frank on May 20, 1958 and assigned to the present assignee. The time position of the grouped pulses on line 32 can be varied continuously by the rotation of phase shifter 30 or by coarse-increments by jumps in the operation of pulse divider chain 31 in response to the application of a signal on line 29. The grouped sampling pulses on line 32 are applied to flip-flop 33, delay 34, even gate 35 and odd gate 36. Flip-flop 33 produces two output grouped pulse signals on lines 37 and 38 which are 180° out of time-phase with respect to each other and at half the repetition rate of the grouped sampling pulses on line 32. The pulses on line 37 condition even gate 35 for conduction whereas the pulses on line 38 condition odd gate 36 for conduction. Thus, the even-numbered pulses of the grouped sampling pulses on line 32 pass through gate 35 and appear on line 39. Similarly, the odd-numbered pulses pass through gate 36 and appear on line 40. The pulses on line 39 are applied jointly to "early-even" sampling gates 14 and 16 and to delay 41. The pulses on line 40 are applied jointly to "early-odd" sampling gates 13 and 15 and to delay 42. Delays 41 and 42 introduce sufficient delay so that if the pulses on lines 43 and 44 are properly aligned to the leading edge of the received loran pulses, then the pulses on lines 39 and 40 will occur slightly in advance of said pulses. Typically, each of delays 41 and 42 introduce an approximately 40 microsecond delay.

The signal at the output of detector 4 is applied to envelope deriver circuit 45 which produces a specially shaped waveform as described in U.S. Patent No. 2,946,019, issued July 19, 1960 to Robert L. Frank and assigned to the present assignee. The derived waveform is characterized by a crossover or null point coinciding with a point on the leading edge of the received loran pulses to which the sampling pulses on lines 43 and 44 are to be synchronized. The derived waveform is applied to odd sampling gate 46 and to even sampling gate 47 which are rendered conductive by the sampling pulses on lines 44 and 43, respectively, unless inhibited by the action of inhibit circuits 48 and 49. Inhibits circuits 48 and 49 are actuated so as to block the sampling pulses on lines 44 and 43 from their respective sampling gates 46 and 47 upon the occurrence of signals on lines 26 and 27, respectively.

The locally generated pulse coded signals are produced in response to signals on line 50 at the output of delay 34 and on line 51 at the output of oscillator 7, in a manner similar to that described in the previously cited U.S. Patent No. 3,099,795. The problem of aligning the locally generated phase coded signals properly to the phase coded signals also is accomplished in a manner similar to the one described in said patent. The phase of the 100 kc. signal on line 51 can be adjusted relative to the carrier phase of the received 100 kc. pulsed loran signals by means of phase control knob 6 on oscillator 7. A zero phase relationship between the local and received signals is achieved by adjustment of knob 6 until D.C. meter 11 reads a positive maximum value. The times at which the local sampling pulses are produced relative to the times of occurrences of the received pulses may be varied by temporarily changing the repetition rate of the pulses on line 50. The time relationship must be changed in order that the local phase code pulses may be brought into coincidence with the received pulses at the inputs to detectors 3 and 4. It will be recognized that the occurrences of the received pulses are randomly related to the occurrences of the local pulses when the receiver embodiment of FIGURE 2 is first energized.

As previously suggested, the repetition rate of the pulses on line 50 may be varied either by the rotation of phase shifter 30 or by the jumping of pulse divider chain 31. Phase shifter 30 may be rapidly driven by opening switch 9 and then energizing slewing motor 8 to vary the time relationship between the locally generated grouped pulses and the received grouped pulses until, eventually, proper synchronization is achieved at the inputs to detectors 3 and 4 and the early sampling pulses applied to gates 13, 14, 15 and 16 are aligned to the received grouped pulses. The attainment of these two conditions produces an output on line 29 to actuate indicator 10 which may be simply a lamp. Upon noting the actuation of indicator 10, the operator deenergizes slewing motor 8 and closes switch 9 to the position shown in the drawing.

The closure of switch 9 establishes a closed loop servomechanism which drives phase shifter 30 until the sampling pulses on lines 43 and 44 are brought into coincidence with the crossover point (null) on the derived waveform applied to sampling gates 46 and 47. The closed loop servomechanism comprises sampling gates 46 and 47, lowpass filter 52, switch 9, servo controller 53, phase shifter 30, pulse divider chain 31, gates 35 and 36, flip-flop 33, delays 41 and 42 and inhibit circuits 48 and 49. It will be recalled that the sampling pulses on lines 43 and 44 are temporarily misaligned relative to the received loran pulses at the time that switch 9 is closed and slewing motor 8 is deenergized in accordance with the aforementioned operator procedure. That is, the pulses on lines 43 and 44 are not at the null of the derived waveform applied to gates 46 and 47. The temporary misalignment produces an output error signal from gates 46 and 47 which are combined and then applied to lowpass filter 52. The low frequency components of the combined error signal drive servo controller 53 to position phase shifter 30 in direction and amount until the pulses on lines 43 and 44 are brought into coincidence with the derived waveform null as required for proper operation in a loran receiver.

The operation of the closed loop servomechanism is adversely affected in the presence of interference synchronous with the component frequencies of either the odd or even-numbered received pulses. If the interference affects the odd-numbered received pulses only, a signal is produced on line 26 for inhibiting circuit 48 so as to prevent the odd-numbered received pulses from passing through sampling gate 46 whereby the servomechanism responds only to the even-numbered received pulses passed by gate 47 which are free from interference. Conversely, if the interference affects the even-numbered received pulses, a signal is produced on line 27 to block sampling gate 47 from passing the contaminated pulses so that the servomechanism responds only (in this case) to the odd-numbered pulses passed by gate 46. It can be seen that gates 46 and 47 are not inhibited in the event that no signal is produced on lines 26 and 27, i.e., if both component frequencies of the received phase coded pulses are subjected to interference or if neither of the component frequencies are subjected to interference.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A synchronous interference rejection system for receivers of phase coded signals, said signals consisting of a repetitive number of pulses, certain numbered pulses of which are sensitive to a first interfering signal and other numbered pulses of which are sensitive to a second interfering signal, said system comprising means for segregating said certain numbered pulses in a first receiver channel and for segregating said other numbered pulses in a second receiver channel, means for detecting the presence of said first interfering signal and the absence of said second interfering signal and for producing a first control signal in response thereto, means for detecting the presence of said second interfering signal and the absence of said first interfering signal and for producing a second control signal in response thereto, means for applying said first control signal to said first receiver channel for inhibiting response to said certain numbered pulses, and means for applying said second control signal to said second receiver channel for inhibiting response to said other numbered pulses.

2. A synchronous interference rejection system as defined in claim 1 wherein said means for applying said first control signal includes first threshold circuit means whereby the response of said first receiver channel to said certain certain numbered pulses is inhibited only when said first control signal exceeds a first threshold, and wherein said means for applying said second control signal includes second threshold circuit means whereby the response of said second receiver channel to said other numbered pulses is inhibited only when said control signal exceeds a second threshold.

3. A synchronous interference rejection system for receivers of phase coded signals, said signals consisting of a repetitive number of pulses, certain numbered pulses of which are sensitive to a first interfering signal and other numbered pulses of which are sensitive to a second interfering signal, said system comprising means for segregating said certain numbered pulses in a first receiver channel and for segregating said other numbered pulses in a second receiver channel, means for detecting the presence of said first interfering signal and said second interfering signal and for producing first and second control signals, respectively, in response thereto, logic circuit means coupled to receive said first and second control signals for producing a third control signal in the presence of said first control signal and and in the absence of said second control signal and for producing a fourth control signal in the absence of said first control signal and in the presence of said second control signal, means for applying said third control signal to said first receiver channel for inhibiting response to said certain numbered pulses, and means for applying said fourth control signal to said second receiver channel for inhibiting response to said other numbered pulses.

4. A synchronous interference rejection system as defined in claim 3 wherein said means for detecting the presence of said first interfering signal includes first threshold circuit means whereby said first control signal is produced only when said first interfering signal exceeds said first threshold, and wherein said means for detecting the presence of said second interfering signal includes second threshold circuit means whereby said second control signal is produced only when said second interfering signal exceeds said second threshold.

5. A synchronous interference rejection system for receivers of phase coded signals, said signals consisting of a repetitive number of pulses, certain numbered pulses of which are sensitive to a first interfering signal and other numbered pulses of which are sensitive to a second interfering signal, said system comprising first pulse sampling means for segregating said certain numbered pulses in a first receiver channel, second pulse sampling means for segregating said other numbered pulses in a second receiver channel, third pulse sampling means for detecting the presence of said first interfering signal and the absence of said second interfering signal and for producing a first control signal in response thereto, fourth pulse sampling means for detecting the presence of said second interfering signal and the absence of said first interfering signal and for producing a second control signal in response thereto, said third pulse sampling means being activated in advance of said first pulse sampling means and said fourth pulse sampling means being activated in advance of said second pulse sampling means, means for applying said first control signal to said first receiver channel for inhibiting response to said certain numbered pulses, and means for applying said second control signal to said second receiver channel for inhibiting response to said other numbered pulses.

6. A synchronous interference rejection system for receivers of phase coded signals, said signals consisting of a repetitive number of pulses, certain numbered pulses of which are sensitive to a first interfering signal and other numbered pulses of which are sensitive to a second interfering signal, said system comprising first pulse sampling means for segregating said certain numbered pulses in a first receiver channel, second pulse sampling means for segregating said other numbered pulses in a second receiver channel, third pulse sampling means for detecting the presence of said first interfering signal and for producing a first control signal in response thereto.

fourth pulse sampling means for detecting the presence of said second interfering signal and for producing a second control signal in response thereto, said third pulse sampling means being activated in advance of said first pulse sampling means and said fourth pulse sampling means being activated in advance of said second pulse sampling means, logic circuit means coupled to receive said first and second control signals for producing a third control signal in the presence of said first control signal and in the absence of said second control signal and for producing a fourth control signal in the absence of said first control signal and in the presence of said second control signal, means for applying said third control signal to said first receiver channel for inhibiting response to said certain numbered pulses, and means for applying said fourth control signal to said second receiver channel for inhibiting response to said other numbered pulses.

7. A synchronous interference rejection system as defined in claim 6 wherein said third pulse sampling means includes first threshold circuit means whereby said first control signal is produced only when said interfering signal exceeds said first threshold, and wherein said fourth pulse sampling means includes second threshold circuit means whereby said second control signal is produced only when said second interfering signal exceeds said second threshold.

References Cited

UNITED STATES PATENTS

| | | | |
|---|---|---|---|
| 3,008,125 | 11/1961 | Zadoff et al. | 340—170 |
| 3,099,835 | 7/1963 | Frank et al. | 343—103 |

RODNEY D. BENNETT, *Primary Examiner.*

CHESTER L. JUSTUS, *Examiner.*

H. C. WAMSLEY, *Assistant Examiner.*